(12) United States Patent
Kroener

(10) Patent No.: US 9,926,230 B2
(45) Date of Patent: Mar. 27, 2018

(54) METHOD OF TREATING AN ACID EFFLUENT CONTAINING PHOSPHORIC ACID

(71) Applicant: Infineon Technologies AG, Neubiberg (DE)

(72) Inventor: Friedrich Kroener, Villach (AT)

(73) Assignee: Infineon Technologies AG, Neubiberg (DE)

( * ) Notice: Subject to any disclaimer, the term of this patent is extended or adjusted under 35 U.S.C. 154(b) by 320 days.

(21) Appl. No.: 14/879,197

(22) Filed: Oct. 9, 2015

(65) Prior Publication Data

US 2017/0101341 A1    Apr. 13, 2017

(51) Int. Cl.
| | | |
|---|---|---|
| *C04B 18/04* | (2006.01) | |
| *C02F 1/66* | (2006.01) | |
| *C04B 28/02* | (2006.01) | |

(52) U.S. Cl.
CPC ............ *C04B 18/0481* (2013.01); *C02F 1/66* (2013.01); *C04B 28/02* (2013.01); *Y02W 30/91* (2015.05)

(58) Field of Classification Search
CPC ... C04B 18/0481; C04B 28/02; C04B 20/023; C04B 18/0418; C02F 1/66
See application file for complete search history.

(56) References Cited

U.S. PATENT DOCUMENTS

| 6,413,417 B1 | 7/2002 | Yamasaki et al. |
| 7,172,699 B1 | 2/2007 | Trivedi et al. |
| 2002/0113023 A1 | 8/2002 | Krulik et al. |
| 2012/0205318 A1 | 8/2012 | Tanida et al. |
| 2016/0060144 A1 | 3/2016 | Kroener et al. |

FOREIGN PATENT DOCUMENTS

| CN | 101327622 A | 12/2008 |
| DE | 296471 A5 | 12/1991 |
| JP | 2002187000 A | 7/2002 |
| JP | 2011092929 A | 5/2011 |
| KR | 20110102071 A | 9/2011 |
| WO | 0185619 A1 | 11/2001 |

OTHER PUBLICATIONS

Duan Jun-Yuan et al., "Study on Treatment of Rhodamine B Wastewater by Micro-electrolysis and Coagulation Method", Feb. 2014, Technology & Development of Chemical Industry, vol. 43, No. 2.
Kroener et al., "All electrochemical layer deposition for crystalline silicon solar cell manufacturing: Experiments and interpretation", Solar Energy 86 (2012), pp. 548-557.

*Primary Examiner* — Anthony J Green
(74) *Attorney, Agent, or Firm* — Viering, Jentschura & Partner mbB

(57) ABSTRACT

A method of treating an acid effluent including phosphoric acid in accordance with various embodiments may include: providing an acid effluent including phosphoric acid; adding a base and silicon particles from a further effluent to the acid effluent including phosphoric acid so that a mixture is obtained and a solid content is formed; separating from the mixture a solid content including silicon and a salt resulting from a reaction of the base with the acid, so that a clarified effluent can be rejected in the environment and a filter press cake can be obtained and further used as additive for concrete.

20 Claims, 11 Drawing Sheets

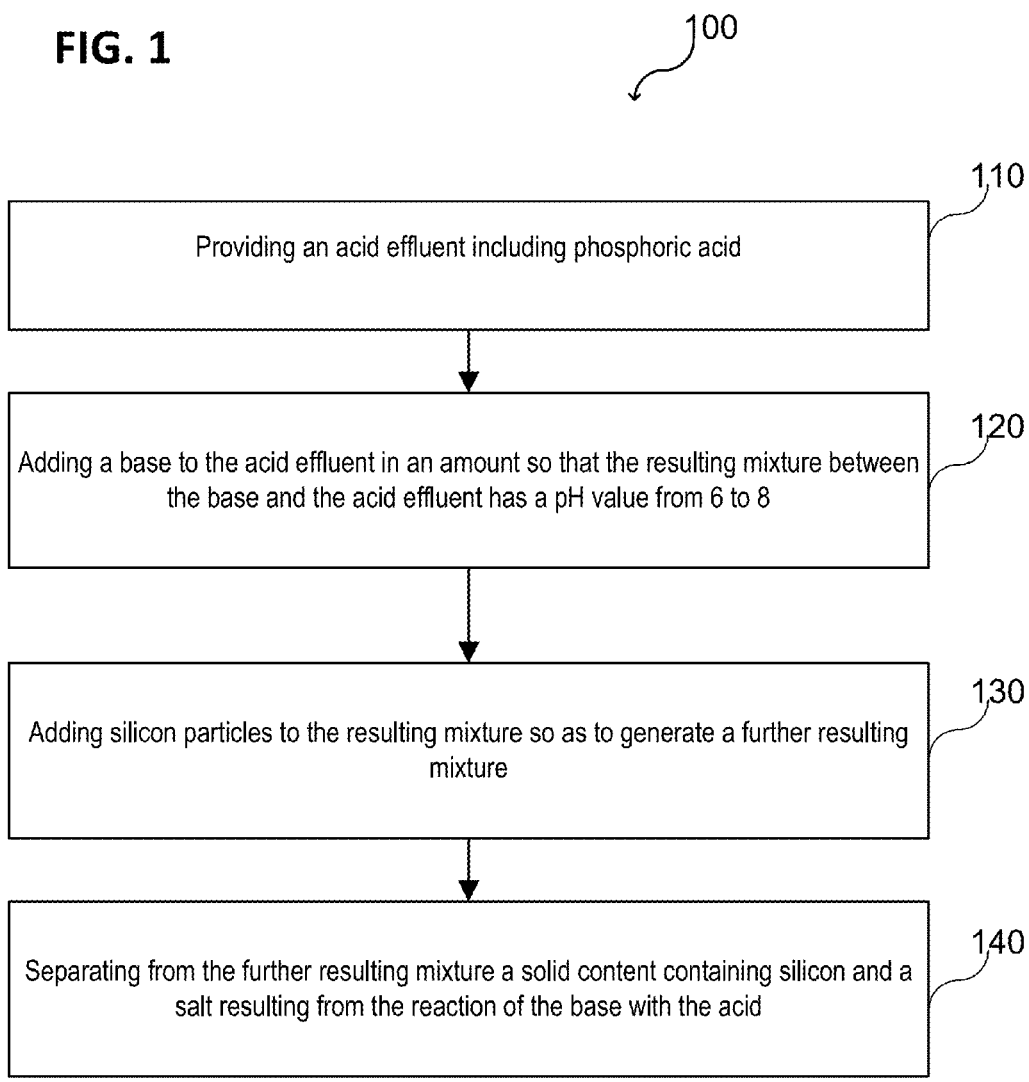

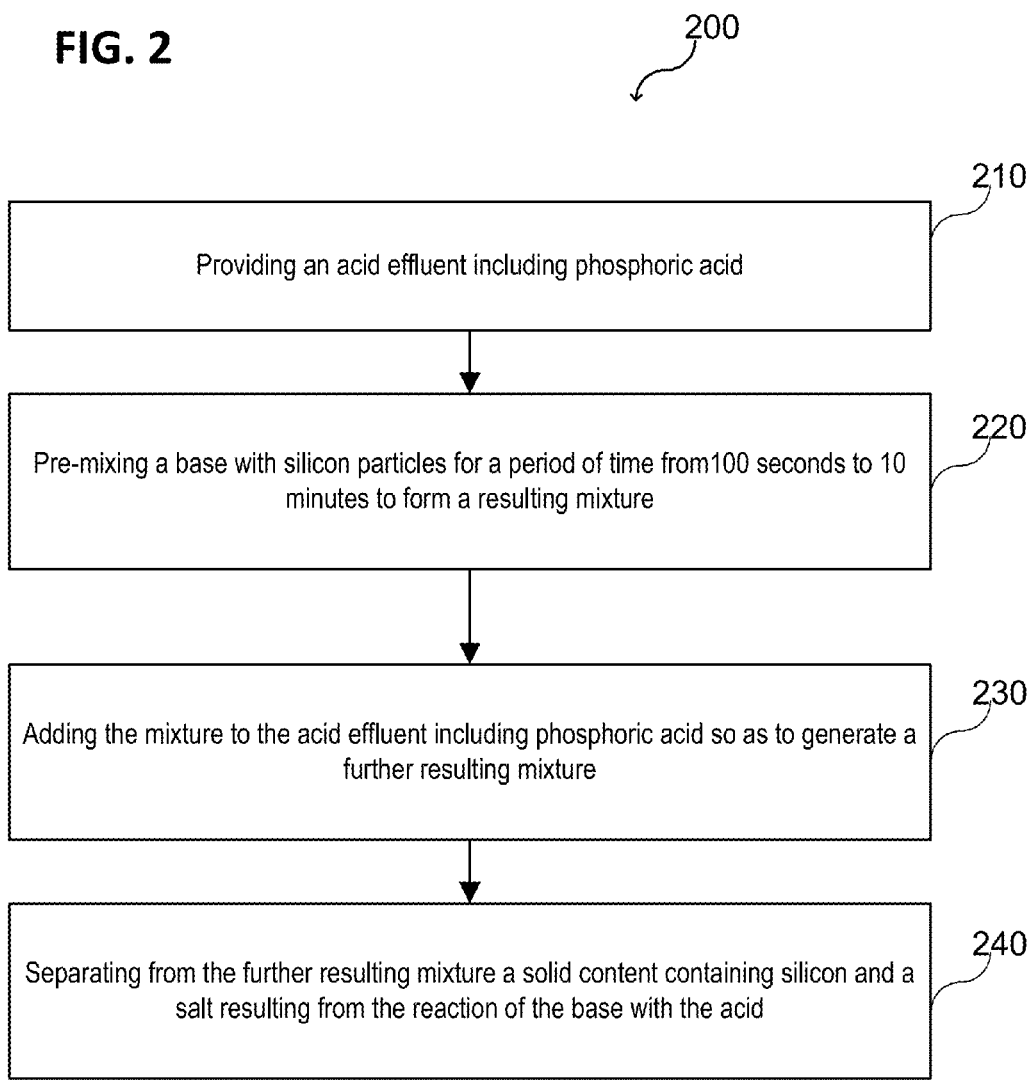

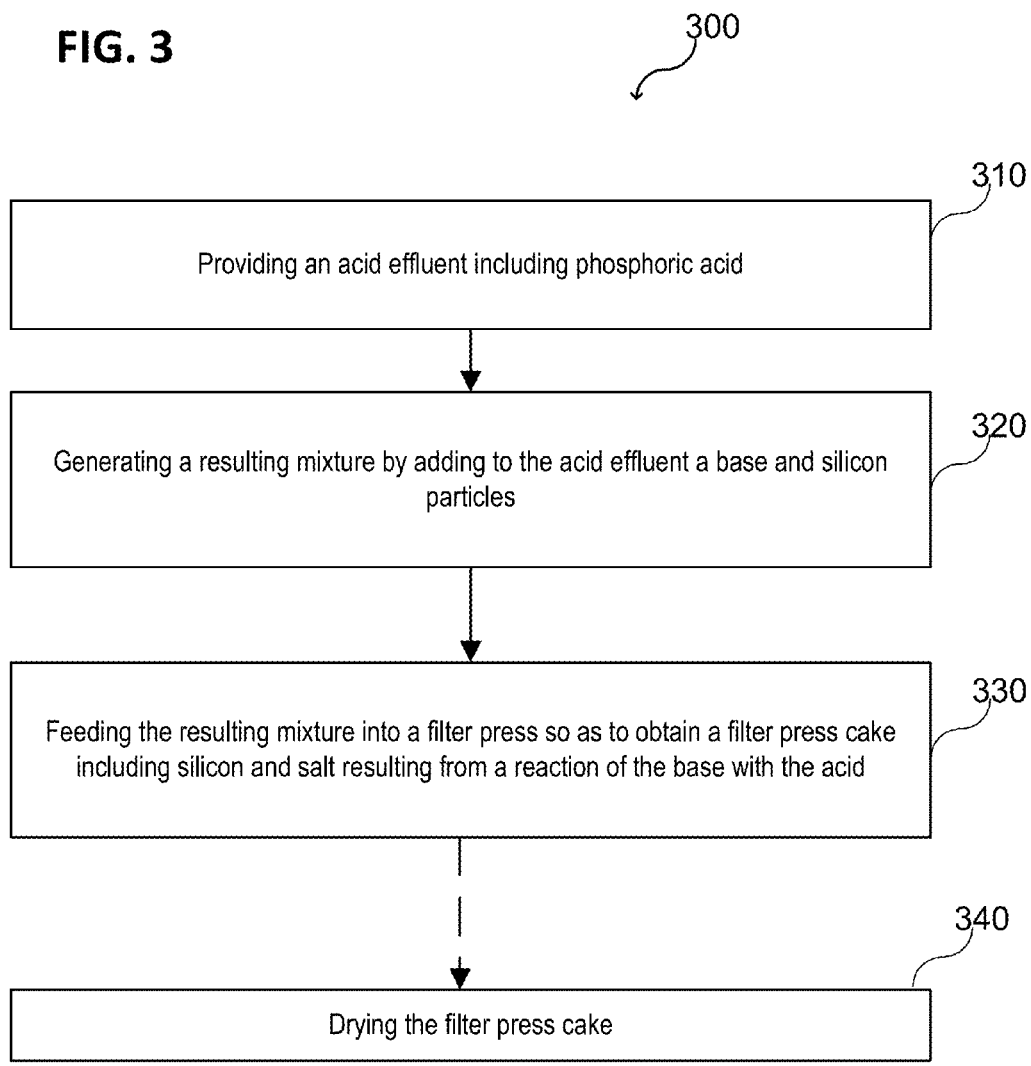

METHOD OF TREATING AN ACID EFFLUENT CONTAINING PHOSPHORIC ACID

TECHNICAL FIELD

Various embodiments relate generally to a method of treating an acid effluent with a base and silicon particles.

BACKGROUND

Effluents may result from an industrial process. Such effluents may be acid. For example, the acid may include phosphoric acid. The acid effluent usually results from the production of one or more semiconductor chips and/or the processing of one or more semiconductor wafers. For example, the processing of a semiconductor wafer may be thinning the wafer by etching. A further effluent may result from the production of one or more semiconductor chips and/or the processing of one or more semiconductor wafers, by one or more of grinding, polishing and thinning of the wafer. For example, such a further effluent may contain silicon in the form of small particles suspended or distributed in the further effluent.

SUMMARY

In accordance with various embodiments, a method of treating an acid effluent including phosphoric acid may include providing an acid effluent including phosphoric acid, generating a mixture by adding to the acid effluent a base and silicon particles, and separating from the mixture a solid content including silicon and a salt resulting from a reaction of the base with the acid.

In accordance with various embodiments, a method of treating an acid effluent including phosphoric acid may include providing an acid effluent including phosphoric acid and generating a mixture by adding to the acid effluent a base and silicon particles. The base is added before the silicon particles. The method may further include separating from the mixture a solid content including silicon and a salt resulting from a reaction of the base with the acid.

In accordance with various embodiments, a method of treating an acid effluent including phosphoric acid may include providing an acid effluent including phosphoric acid and generating a mixture by adding to the acid effluent including phosphoric acid a base and silicon particles. The base and the silicon are pre-mixed and added to the acid effluent together. The method may further include separating from the mixture a solid content including silicon and a salt resulting from a reaction of the base with the acid.

In accordance with various embodiments, a method of producing an additive for concrete may include providing an acid effluent including phosphoric acid, generating a mixture by adding to the acid effluent a base and silicon particles, and feeding the mixture into a filter press so as to obtain a filter press cake including silicon and a salt resulting from a reaction of the base with the acid.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1 is a flow chart illustrating a method of treating an acid effluent including phosphoric acid in accordance with various embodiments;

FIG. 2 is a flow chart illustrating a method of treating an acid effluent including phosphoric acid in accordance with various embodiments;

FIG. 3 is a flow chart illustrating a method of producing an additive for concrete in accordance with various embodiments;

DESCRIPTION

Figure 4A:
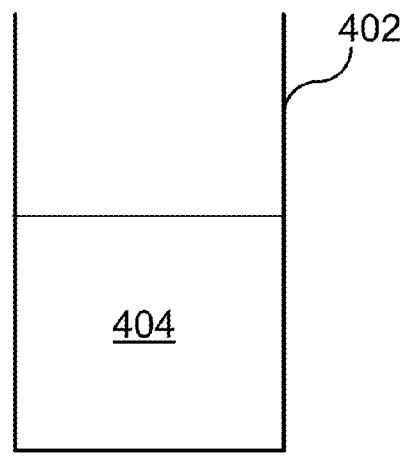
FIGS. 4A and 4b show a laboratory beaker containing a further effluent (a sample of a further effluent) containing silicon particles.
Figure 4B:
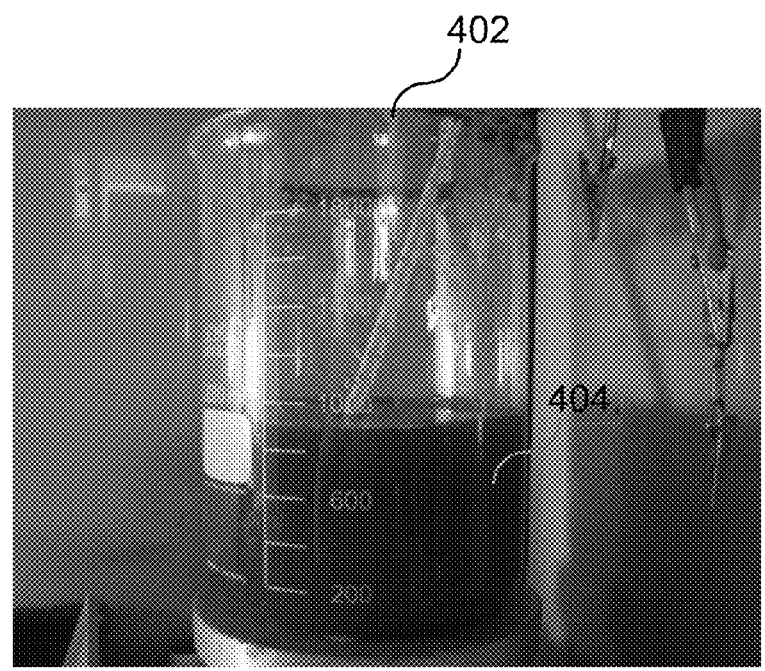

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural and logical changes may be made without departing from the scope of the invention. The various embodiments are not necessarily mutually exclusive, as all or some embodiments can be combined with one or more other embodiments to form new embodiments.

The word "exemplary" is used herein to mean "serving as an example, instance, or illustration". Any embodiment or design described herein as "exemplary" is not necessarily to be construed as preferred or advantageous over other embodiments or designs.

The term "at least one" and "one or more" may be understood to include any integer number greater than or equal to one, i.e. one, two, three, four, . . . , etc.

The term "base" is used herein to mean a substance that gives hydroxide ions when dissolved in water.

The term "room temperature" is used herein to mean a temperature of 20° C. or 25° C.

The term "sediment" is used herein to mean a collection of small particles of solid matter that settle out of a suspension to the bottom of the liquid.

The term "effluent" is used herein to mean wastewater—treated or untreated—that flows out of a treatment plant, sewer, or industrial outfall.

The term "homogeneous" with regard to a mixture is used herein to mean the components—dissolved or not dissolved—that make up the mixture are uniformly distributed throughout the mixture. The composition of the mixture is the same throughout.

Processing of a semiconductor wafer, for example by one or more thinning of the wafer, for example etching of the wafer, may result in an acid effluent, for example containing phosphoric acid. In certain cases it might be helpful to treat or purify such an effluent before releasing it into the environment. To this end, the acid effluent containing phosphoric acid may be neutralized. By way of example, it may be treated by adding a base to the entire effluent in an amount so that the resulting mixture of acid effluent and base may have a pH value of about 7. The neutralization of the acid of the effluent with the base may result in the formation of a solid content, e.g. salts. Such a resulting mixture containing a solid content may not be released into the environment without the solid content being removed. It may then be desirable to separate the resulting mixture from the solid content. To this end, the resulting mixture may be led through a filter element. From the filtration stage, salts resulting from a reaction of the base with the acid and a clarified effluent are separated from each other, so that the clarified effluent can be released into the environment. The filtration process may be performed using a press filter so as to obtain the salts in form of a filter press cake. Sometimes the filter press cake may be acid, that is, when the filter press cake is let in contact with water for a period of time, e.g. from about 10 minutes to about 10 hours, and/or when at least part of the filter press cake is dissolved in water, the pH value of the resulting solution may be acid, e.g. the resulting solution may have a pH value from about 3 to about 5. Such an acid filter press cake may be declared as waste and therefore may be disposed and paid. However, the filter press cake may be neutral, that is when the filter press cake is let in contact with water for a period of time, e.g. from about 10 minutes to about 10 hours, and/or when at least part of the filter press cake is dissolved in water, the pH value of the resulting solution may be about 7. Such a neutral filter press cake may be used as additive for concrete and in this way recycled for another purpose, for example in the concrete industry. Such a neutral filter press cake may be desirable for its added value. Further, for the purpose of selling the filter press to another industry, for example the concrete industry, the filter press cake may be easily transportable. For example, the filter press cake may have a solid consistency.

Various embodiments provide a method of treating an acid effluent, e.g. a method of treating an acid effluent including phosphoric acid by adding a base and silicon particles to obtain a mixture containing a solid content, and separating from the mixture a solid content including silicon and a salt resulting from a reaction of the base with the acid.

Alternatively or additionally, a method of treating an acid effluent in accordance with various embodiments of this disclosure may allow the formation of a solid content including silicon and a salt resulting from a reaction of the base with the acid obtained from the treatment of an acid effluent including phosphoric acid by adding a base and silicon particles to obtain a mixture containing the solid content. The solid content may be separated from the mixture, for example by filtration, for example by using a filter press so as to form a filter press cake. The filter press cake may be neutral. Additionally, the filter press cake may have a solid consistency and be easily transportable. A filter press cake having such properties, e.g. neutral and with a solid consistency, may be used for further application in the concrete industry. For example, the filter press cake may be used as additive for concrete.

Alternatively or additionally, the method may allow the separation of treated effluent, e.g. clarified effluent that may be released into the environment, and a solid content including silicon and a salt resulting from a reaction of the base with the acid in a cost-effective and/or simple and/or reliable and/or rapid manner.

Alternatively or additionally, the method may allow the treatment of large quantities of acid effluent, such as quantities of up to 100 $m^3$ per day since the method is fast and scalable.

Conventionally, it is possible to treat an acid effluent by adding a base in an amount so that the resulting mixture of the acid effluent and the base is neutral. To this end, the base reacts with the acid in the effluent and a salt from the reaction of the base with the acid is formed. The resulting mixture of clarified effluent and salt may then be separated, e.g. filtered using a filter press to obtain a filter press cake.

Using the above approach, the acid effluent can be treated to give a clarified water having a neutral pH value. Nevertheless, the filter press cake produced by this approach is acid. Such a filter press cake is not usable for further purposes and represents only waste that have to be get rid off.

Alternatively, it is possible to treat an acid effluent by adding it to a basic solution, wherein the base is provided in an amount so that the resulting mixture of the acid effluent and the basic solution has a neutral pH value, and the salt resulting from a reaction of the base with the acid is separated from the mixture using a filter press to obtain a filter press cake. Nevertheless, the filter press cake obtained from this approach has in some embodiments the consistency of a sludge and is therefore not easily transportable and additionally cannot easily be used for other purposes, e.g. as additive for concrete in the concrete industry.

An aspect of various embodiments described herein may be seen in that a base is added to the acid effluent including phosphoric acid in an amount so that the resulting mixture of the base and the acid effluent has a light acid to light basic pH value, e.g. the pH value may be from 6 to 8, before silicon particles are added. The anions of the base may react with the protons from the acids of the acid effluent including phosphoric acid to produce water. The counterion of the base may react with the counterion of the acid to form a salt containing for example phosphate. Silicon particles may be added to the resulting mixture to form a further resulting mixture, so that the silicon particles may cross link with at least part of the salt containing for example phosphate to form a solid content including silicon and a salt resulting from a reaction of the base with the acid. In one or some embodiments, the addition of the silicon particles may be subsequent to the addition of the base. Alternatively, the addition of the silicon particles may occur in a concomittant manner, after the addition of the base to the acid effluent has started but is not yet completed, e.g. the resulting mixture of the acid effluent and the base has not yet reached a pH value from 7 to 8. Once the solid content is formed, it may be separated from the further resulting mixture.

The base and the silicon particles may be pre-mixed and added together to the acid effluent including phosphoric acid. The base and silicon particles may be pre-mixed under agitation for a short period of time, e.g. the period of time may be from 100 seconds to 10 minutes. Such a short period of time is selected to prevent the base to react with the silicon particles to a large extent so that the amount of base available to react with the acid of the acid effluent is not sufficient to reach a pH value from 6 to 8. This way of proceeding allows enough base to be available to react with the acid. Further, it allows a cross-linking reaction between the silicon particles and the acid counterion of the acid effluent, e.g. the phosphate to be in competition with the formation of the salt resulting from a reaction of the base with the acid. The base and silicon particles may be pre-mixed at room temperature. The addition of the pre-mixed base and silicon particles to the acid effluent including phosphoric acid may be performed at once and/or at room temperature.

FIG. 1 shows a flow chart illustrating a method 100 of treating an acid effluent including phosphoric acid in accordance with various embodiments.

Method 100 may include, in 110, providing an acid effluent including phosphoric acid. The method may further include, in 120, adding a base to the acid effluent in an amount so that the resulting mixture between the base and the acid effluent has a pH value from 7 to 8, and, in 130, adding silicon particles to the acid effluent so as to generate a further resulting mixture. The method may further include, in 140, separating from the further resulting mixture a solid content containing silicon and a salt resulting from a reaction of the base with the acid.

In 110, the acid effluent includes phosphoric acid. The concentration of phosphoric acid may be from about 1 to about 3 mol/l, for example, from about 1.5 mol/l to about 2.5 mol/l, for example 2 mol/l in the acid effluent. The acid effluent may originate from a processing of one or more wafers, so that other acids may be included in the acid effluent as well. For example, the processing of one or more wafer may be thinning, for example etching. The acid effluent may further contain one or more of hydrofluoric acid, nitric acid, and sulfuric acid from about 0.5 mol/l to about 6 mol/l, for example from about 2 mol/l to about 4 mol/l. The acid effluent may have a total acid concentration, that is, the total concentration of acids may be from about 1 mol/l to about 9 mol/l, for example from about 1 mol/l to about 6 mol/l, for example from about 2 mol/l to about 3 mol/l.

In 120, the addition of the base may be performed under agitation so as to obtain a homogeneous mixture and the base be evenly distributed in the acid effluent. For example, the agitation may be mechanical or magnetic agitation. Additionally the addition of the base may be pH-monitored. For example, the addition of the base may be electrochemically pH-monitored. For example, the pH-monitoring may be performed using a pH-meter, e.g. electrodes. Additionally, the addition of the base may be performed stepwise, that is, the base may be added in small portions to the acid effluent. For example, the base may be added in portion of about 1/10 of the total amount of base to add, calculated from the amount necessary to neutralize the acid(s) in the acid effluent, for example about 1/8, for example about 1/6. To this end, a further portion of base may be added to the acid effluent when the pH value of the resulting mixture is stable and under the desired pH value from 7 to 8. The addition of the base is completed when then pH value of the resulting mixture is from 7 to 8, for example from 7.5 to 8. This way of proceeding avoids the addition of an amount of base which would lead to a resulting mixture having a pH value of less than 7 or more than 8.

For example in 120, the base may contain one or more of the alkali from the second group of the periodic table. For example the base may be selected from the group consisting of calcium hydroxide, calcium oxide, barium hydroxyde, barium oxide, magnesium hydroxide and combination thereof. Preferably the base may be one or more of calcium hydroxide and calcium oxide.

In 120, the base may be added in form of a solid. Alternatively, the base may be added in aqueous solution. For example the base solution may be available commercially or may be freshly prepared before addition by adding the base in solid form to an aqueous solution, e.g. water. For example, the base may be lime milk solution. For example the base solution may have a concentration from about 0.5 mol/l to 3 mol/l, for example from about 2 mol/l to about 3 mol/.

The addition of the base may be performed at a temperature from about 18° C. to about 28° C., for example at room temperature. The temperature of the resulting mixture of the acid effluent and the base may increase during the addition of the base. However, the increase of temperature of the resulting mixture does not occur to an extent, that it leads to a thermal runaway, e.g. the temperature of the resulting mixture does not exceed about 60° C.

In 130, silicon particles are added to the resulting mixture to obtain a further resulting mixture. The addition of the silicon particles may be added under agitation. For example, agitation may be mechanical or magnetical agitation. In 130, the addition of the silicon particles to the resulting mixture may be subsequent to the addition of the base or may occur in a concomittant manner, that is, after the addition of the base has started but is not yet completed, e.g. the pH value of the resulting mixture is not yet from 7 to 8. In 130, the silicon particles may come from a further effluent. The further effluent may come from a production of one or more chips and/or a processing of one or more wafers. For example, the processing of one or more wafers is grinding, polishing, and thinning of the wafer. Therefore the further effluent may contain silicon in form of small solid particles. For example, the silicon particles may have a size from about 2 μm to about 20 μm, for example from about 5 μm to 10 μm.

The silicon particles in 130 may be added to the resulting mixture in form of a sediment obtained by treating the further effluent containing silicon. For example, the further effluent containing silicon may be treated by adding a base to it. To this end, a base may be added to the further effluent containing silicon in an amount being sub-stoichiometric with regard to a basic oxidation reaction of an entire amount of silicon contained in the further effluent to ortho-silicic acid or ortho-silicate ions. The resulting mixture of the further effluent containing silicon and the base may be maintained in a temperature range from about 40° C. to about 80° C., for example from 45° C. to 85° C., for example from 50° C. to 80° C., for example 55° C. to 75° C., for example from 60° C. to 70° C., from for a period of time, so that a sediment including silicon particles may be formed. For example, the period of time may be from about 2 minutes to about 14 minutes, for example form 3 minutes to 12 minutes, for example from 4 minutes to 10 minutes, for example from 5 minutes to 9 minutes, for example from 6 minutes to 8 minutes. For example, the base may contain one or more of sodium hydroxide, potassium hydroxide, calcium hydroxyde, barium hydroxide, ammonium phosphate and ammonia. The base may be added stepwise. Optionally a specific compound may be additionally added to the further effluent water to promote the sedimentation. For example, the specific compound may be selected from the group consisting of diammonium phosphate, mono-ammonium phosphate, ammonium sulfate, ammonium hydrogen sulfate and combinations thereof. Once the sediment is formed, maintaining the mixture in the temperature range from about 40° C. to about 80° C. for a period of time may be terminated. The silicon particles may be removed from the further effluent by separating the sediment and the further effluent from each other, e.g. by decantation of the clarified effluent above the sediment or by draining out the clarified effluent above the sediment. Using this approach, the silicon particle size may be in the range from about 10 μm to about 50 μm, for example from about 20 μm to about 40 μm.

Alternatively, in 130, the silicon particles may be added to the resulting mixture in form of a dispersion (e.g. suspension or slurry) in the further effluent containing small solid silicon particles to the resulting mixture or to the base.

Alternatively or additionally, the silicon particles may be high-purity doped silicon and may contain a small proportion of oxygen and/or hydrogen, e.g. a proportion of oxygen and/or hydrogen from 0.1% to 1%. Additionally, the silicon particles may contain other elements selected from the group consisting of phosphor, bore, arsenic, aluminium and combination thereof. The addition of the silicon particles to the resulting mixture may be performed stepwise or at once. For example the silicon particles may be added by portion of about ¼, for example of about ⅓, for example of about ½ of the total amount of silicon particles to be added.

In 130, the addition of the silicon particles to the resulting mixture may be performed at a temperature from about 15° C. to about 30° C., for example from about 18° C. to about 25° C., for example at about room temperature.

In 130, the amount of silicon particles added is such to obtain a mass concentration of silicon particles in the further resulting mixture from about 10 g/l to 100 gl/l, for example from about 50 g/l to 100 gl/l, for example about 20 g/l.

In 130, the further resulting mixture may be a dispersion in an aqueous solution, e.g. a suspension of a solid content containing silicon and a salt resulting from a reaction of the base with the acid. The silicon may be silicon particles selected from the group consisting of high-purity doted silicon, cross-linked silicon together with phosphate and silicon agglomerates containing one or more silicate. The salt resulting from a reaction of the base with the acid may be one or more of calcium phosphate, calcium sulfate, calcium fluoride, calcium nitrate, barium phosphate, barium sulfate, barium fluoride, barium nitrate, magnesium phosphate, magnesium sulfate, magnesium fluoride, magnesium nitrate.

In 140, the solid content containing silicon and a salt resulting from a reaction of the base with the acid may be separated from the further resulting mixture. The separation may be performed by using vacuum distillation, centifugation, or filter press. For example, the further resulting mixture may be introduced into a filter press. Further a pressure from about 1 000 Pa to about 10 000 Pa may be applied. For example, the pressure may be applied using an aluminium plate, a coated or protected metal plate. For example, the pore size of the filter press may be from about 5 μm to about 50 μm, for example, from 10 μm to 20 μm.

FIG. 2 shows a flow chart illustrating a method 200 of treating an acid effluent including phosphoric acid in accordance with various embodiments.

Method 200 may include, in 210 providing an acid effluent including phosphoric acid, and, in 220, pre-mixing a base with silicon particles for a period of time from about 100 seconds to 10 minutes, for example from 100 seconds to 600 seconds to form a resulting mixture. The method may further include, in 230, adding the resulting mixture to the acid effluent including phosphoric acid so as to generate a further resulting mixture, and, in 240, separating from the further resulting mixture a solid content containing silicon and a salt resulting from a reaction of the base with the acid.

In 210, the processing stage corresponds to the one in 110.

In 220, the base and silicon particles may be pre-mixed under agitation to form a resulting mixture. The resulting mixture may be agitated for a short period of time, e.g. the period of time may be from 100 seconds to 10 minutes, so that the silicon particles from the further effluent and the base don't react together to a too large extent, e.g. the amount of base present in the resulting mixture is such that the acid of the acid effluent including phosphoric acid can be neutralized by the base In 220, the base may be provided in aqueous solution. For example, the aqueous solution of base may be commercially available. Further, the aqueous solution of base obtained from adding the base in solid form to an aqueous solution, e.g. water. Additionally or alternatively, the aqueous solution of base may be obtained from adding the base in solid form to the further effluent containing silicon particles. The amount of the base added may be such that the concentration of the base in the mixture may be slightly over stoechiometric in respect to the acid of the acid effluent to be neutralized, e.g. the concentration of base in the aqueous solution is from about 0.5 mol/l to about 3 mol/l, for example from 2 mol/l to 3 mol/l.

In one or more embodiment in 220 the base may be provided in solid form. The base may be mixed with silicon particles to form a solid mixture.

In 220, the silicon particles may be in form of sediments obtained by adding a base to a further effluent containing silicon as obtained for processing stage 130.

In 220, the base and silicon particles may be pre-mixed at room temperature.

In 230, the addition of the mixture of pre-mixed base and silicon particles to the acid effluent including phosphoric acid may be performed at once and/or at room temperature to obtain a further resulting mixture. In one embodiment, the further resulting mixture may be the same as the one obtained in processing stage 130. In various embodiments, the further resulting mixture may have a similar composition with different proportions of silicon and salts as the one obtained in processing stage 130.

In 240, the processing stage corresponds to the one of 140.

FIG. 3 shows a flow chart illustrating a method 300 of producing an additive for concrete in accordance with various embodiments.

Method 300 may include, in 310, providing an acid effluent including phosphoric acid, and, in 320, generating a resulting mixture by adding to the acid effluent a base and silicon particles. The method may further include, in 330, feeding the resulting mixture into a filter press so as to obtain a filter press cake including silicon and a salt resulting from a reaction of the base with the acid, and in 340, optionally drying the filter press cake.

In 310, the processing stage corresponds to the one in 110.

In 320, in one embodiment, the processing stage may be performed according to the processing stages 120 and 140. In a further embodiment, in 320, the processing stage may be performed according to the processing stages 220 and 230.

In 330, the mixture resulting from the acid effluent, the base and silicon particles may be fed into a filter press. Further, a pressure from about 1 000 Pa to about 10 000 Pa may be applied. For example, the pressure may be applied using an aluminium plate, a coated or protected metal plate. In various embodiments, the filter press may have a capacity from about 0.5 m$^3$ to about 5 m$^3$. In various embodiments, the size of the pores of the filter in the filter press may be from about 10 µm to about 20 µm.

In various embodiments, in 340, method 300 may further include a processing stage of drying the filter press cake. For example, drying the filter press cake may be performed by using evaporation on air. For example drying process may be performed under vacuum. For example the vacuum value may be from about 5 Pa to about 800 Pa, for example from about 5 Pa to about 400 Pa, for example from about 5 Pa to about 200 Pa, for example from about 5 Pa to about 20 Pa. Alternatively or additionally, the drying process may be performed at a temperature from about 20° C. to about 40° C.

In 330 and/or 340, the filter press cake may have a solid consistency. For example, the filter press cake may not fall apart when taken out from the filter press. The filter press cake may be in form of a solid powder. In one or more embodiment, the filter press cake may include particles. The particles may have a diameter size of about 10 µm to 100 µm.

In 330 and/or 340, the filter press cake may be neutral. Further, the filter press cake may be used in the concrete industry, e.g. as additive for concrete.

In the following, examples in which the present disclosure has been put into practice are described with reference to FIGS. 4 to 9 of the drawings.

Silicon Particles

First, a sample of 1 liter has been taken from an effluent including silicon particles originating from a production of chips, in particular from a wafer polishing process. As illustrated in FIG. 4A and shown in FIG. 4B, the effluent/sample 404 is introduced into a beaker 402. The effluent/sample 404 forms a dispersion (e.g., slurry or suspension) containing silicon in form of small solid silicon particles evenly distributed therein. The dispersion has a dark and turbid appearance or character.

The amount of silicon particles contained in the sample 404 was approximately 400 mg per liter, with most of the silicon particles contained in the effluent being from submicrometer to several micrometer range. Further, the effluent/sample 404 contained a small amount of arsenic.

Figure 5A:
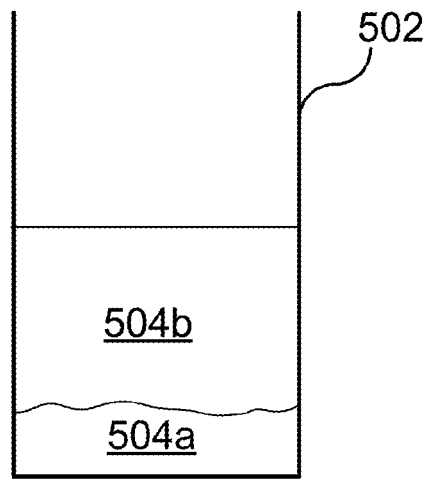
FIGS. 5A and 5B show the laboratory beaker of FIGS. 4A and 4B containing the further effluent containing silicon particles treated with base.
Figure 5B:
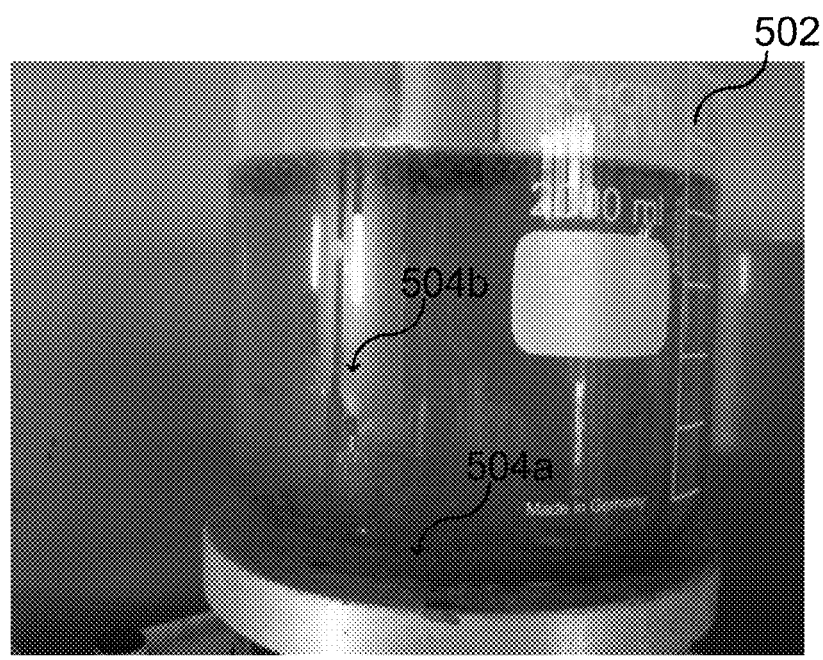

The effluent/sample 404 was heated at around 40-50° C. and was treated with 300 mg calcium oxide. Calcium oxide was added to the effluent/sample 404 in a sub-stoichiometric amount (with regard to a basic oxidation reaction of the entire amount of the silicon contained in the effluent to ortho-silicic acid or ortho-silicate ions). The reaction could start after five minutes agitation to form a sediment 504a including silicon. As illustrated in FIG. 5A and shown in FIG. 5B, after the agitation was stopped, the sediment 504a could settle at the bottom of the beaker 502. Beaker 502 is the same as beaker 402 in FIGS. 4A and 4B. Clarified effluent 504b is over the sediment 504a. The sediment including silicon particles 504b is removed from the effluent 404 by separating the sediment and the effluent from each other, e.g. by decantation of the clarified effluent 504b above the sediment 504a or by draining out the clarified effluent 504b above the sediment 504a.

Figure 6:
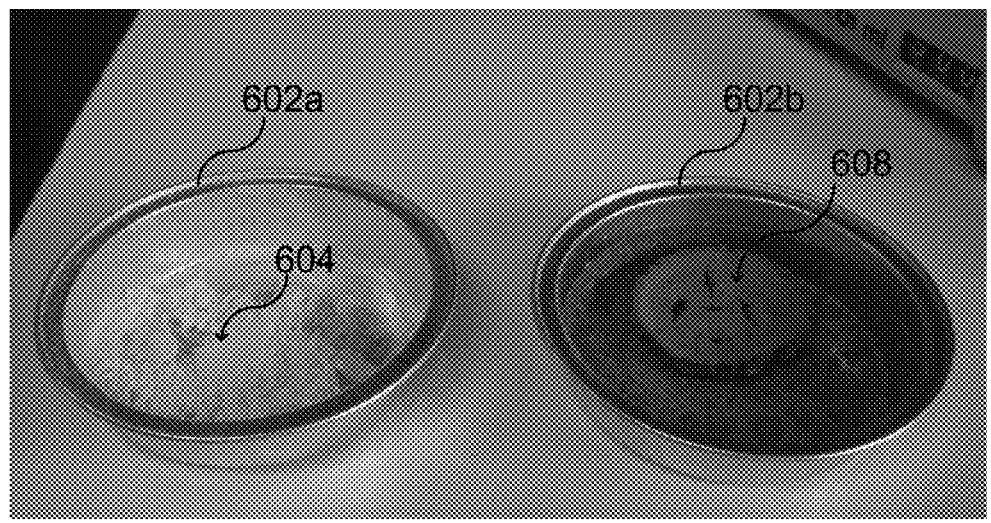
FIG. 6 shows Petri dishes, with the left Petri dish containing the quicklime to be added to the further effluent containing silicon particles, and with the right Petri dish containing the silicon particles obtained by adding the quicklime to the further effluent, filtrating and drying the sediment formed.

As show in FIG. 6, in Petri dish 602a can be seen the amount of calcium oxide 604 added to the one liter effluent 404 and in Petri dish 602b can be seen the sediment 608 obtained after treatment of the one liter effluent 404 with the calcium oxide 604, filtration of the sediment 504a and drying process.

Figure 7A:
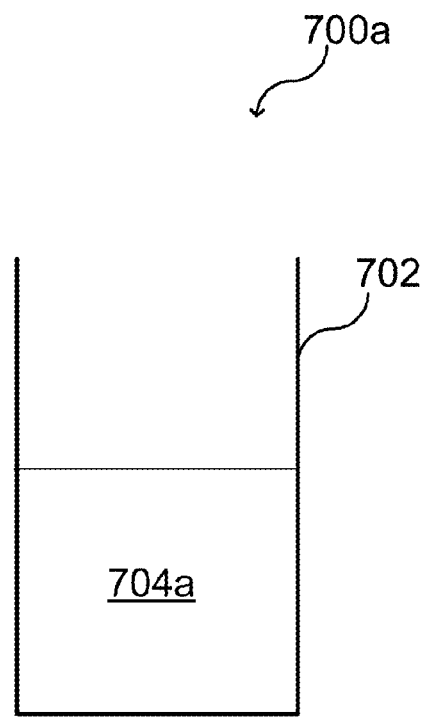
FIGS. 7A to 7F schematically illustrate a method of treating an acid effluent including phosphoric acid at various stages in accordance with various embodiments.
Figure 7B:
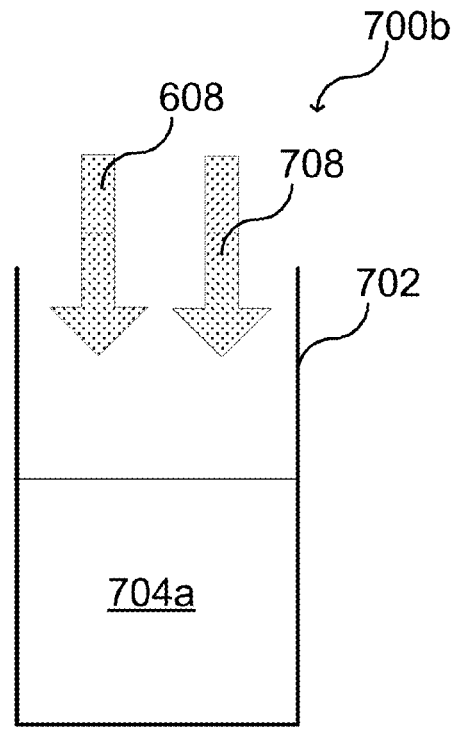
Figure 7C:
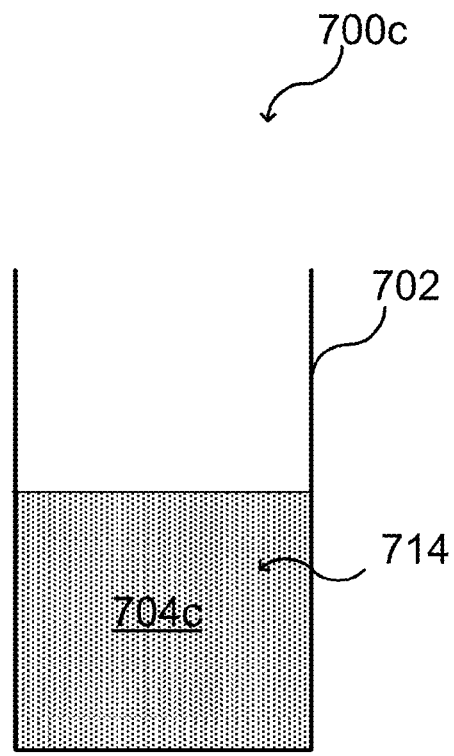
Figure 7D:
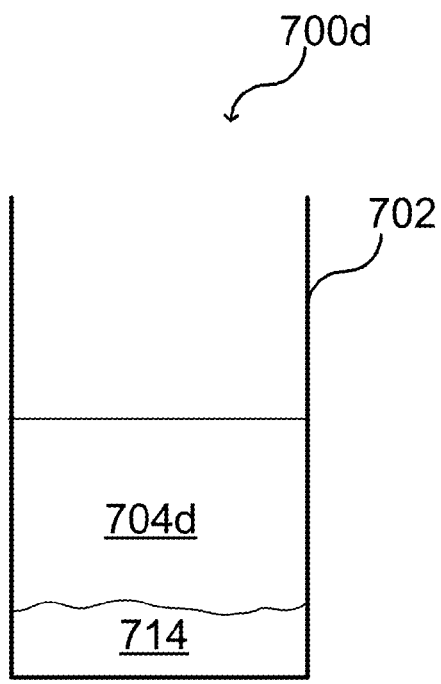
Figure 7E:
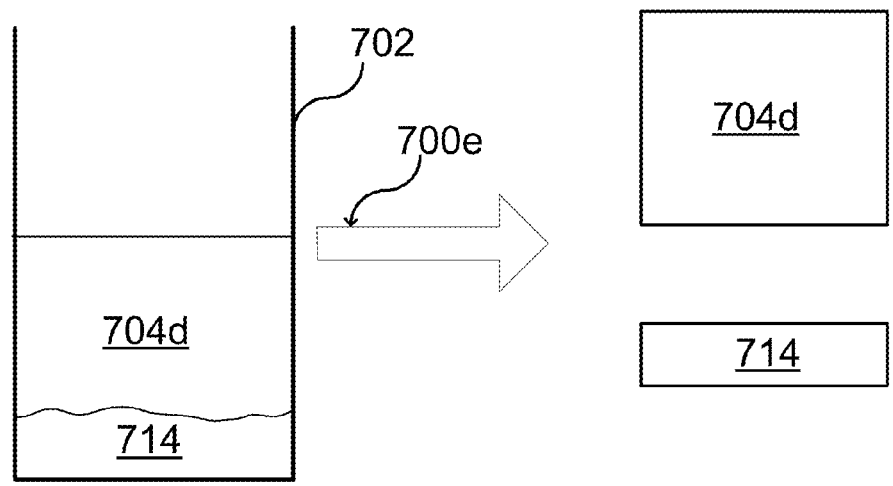
Figure 7F:
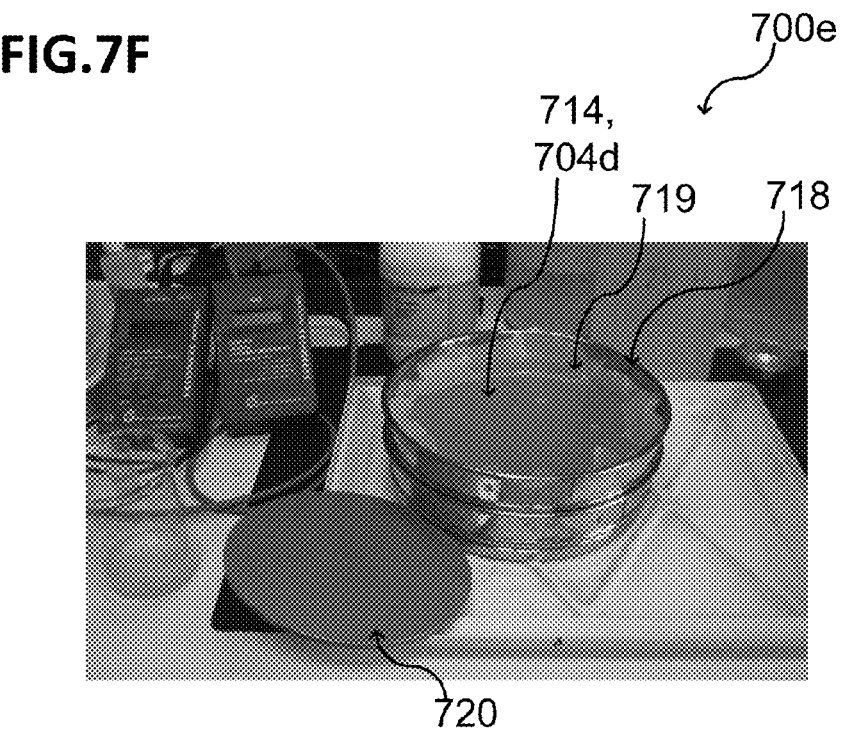

FIG. 7A to FIG. 7F schematically illustrate the method of treating an acid effluent according to one embodiment. Initially, as illustrated in FIG. 7A, in 700a, the acid effluent including phosphoric acid 704a is provided in a vessel 702 and corresponds to processing stages 110, 210 and 310. The acid effluent 704a forms a solution and has a clear appearance. Next, as illustrated in FIG. 7B, in 700b, a base 708 (for example solid calcium oxide, calcium hydroxide, barium oxide, barium hydroxide, magnesium hydroxide) is added to the acid effluent including phosphoric acid 704a. The addition of the base 708 is performed stepwise and is pH-monitored. The silicon particles 608 are added subsequently. The silicon particles 608 are added to the effluent including phosphoric acid 704a after complete addition of the base 708 (i.e., when the pH value of the resulting mixture is from 7 to 8) or in a concomittant manner (i.e., when the addition of the base is not yet completed). As illustrated in FIG. 7C, in 700c, the further resulting mixture 704c is agitated, so that a solid content 714 is formed. These processes correspond to processing stages 120 and 130, or 320. Then, as illustrated in FIG. 7D, in 700d, the agitation is stopped and the solid content 714 is left to settle for a period of time from about 1 minute to about 10 minutes. Above the solid content 714 is clarified effluent 704d. As illustrated in FIG. 7E, in 700e, the solid content 714 is separated from the clarified effluent 704d to obtain a filter press cake 714 and correspond to processing steps 140, 240 or 330. FIG. 7F shows a filtration device 718 that may be used for the step of separating 700e the solid content 714 from the further resulting mixture 704d in accordance with the present disclosure. The filter device 718 has a filter 719 and a aluminium plate 720.

EXAMPLES

The example according to one embodiment was obtained by adding 50 ml of quicklime (calcium oxide) 708 at a concentration of 55 g/l (in form of a lime milk solution) to 14 ml of the effluent containing phosphoric acid 704a at a concentration of 2 mol/l in a vessel 702. When a stable pH value from 7.5 to 8 was obtained, 150 mg of silicon particles 608 in form of sediments obtained as described above were added. The resulting mixture 704c was agitated at 50° C. for 15 min. Thereby, a solid content 714 was formed. No change of the pH value was observed. The agitation was stopped and the resulting mixture 704c was let to settle overnight, e.g. 10 hours. In this respect, it is assumed that the solid content 714 was formed by silicon particles which aggregated with the salt resulting from a reaction of the base with the acid and settled down. It is also assumed that the clarified effluent 704d that appeared after the settling down of the solid content 714 was substantially free from the salt resulting from a reaction of the base with the acid. The solid content 714 could be separated from the clarified effluent 704d by filtration through a 10 µm square-shaped holes filter and manually pressed with an aluminium plate sealed with synthetic resin. A filter press cake 804a was obtained.

Comparative Example

The comparative example corresponds to the method of treating as illustrated in FIGS. 7A to 7B in which the stage of addition of silicon was omitted. The comparative example was obtained by adding 50 ml of quicklime (calcium oxide) at a concentration of 55 g/l (in form of a lime milk solution) to 14 ml of the effluent containing phosphoric acid 704a at a concentration of 2 mol/l in a vessel 702. When a stable pH value from 7.5 to 8 was obtained, the resulting mixture 704c was agitated at 50° C. for 15 min. Thereby, a solid content 714 was formed. No change of the pH value was observed. The agitation was stopped and the resulting mixture 704c was let to settle overnight, e.g. 10 hours. In this respect, it is assumed that the solid content 714 was formed by the salt resulting from a reaction of the base with the acid and settled down. It is also assumed that the clarified effluent 704*d* that appeared after the settling down of the solid content 714 was substantially free from the salt resulting from a reaction of the base with the acid. The solid content 714 could be separated from the clarified effluent 704*d* by filtration through a 10 μm square-shaped holes and manually pressed with an aluminium plate sealed with synthetic resin. A filter press cake 804*b* was obtained.

Figure 8A:
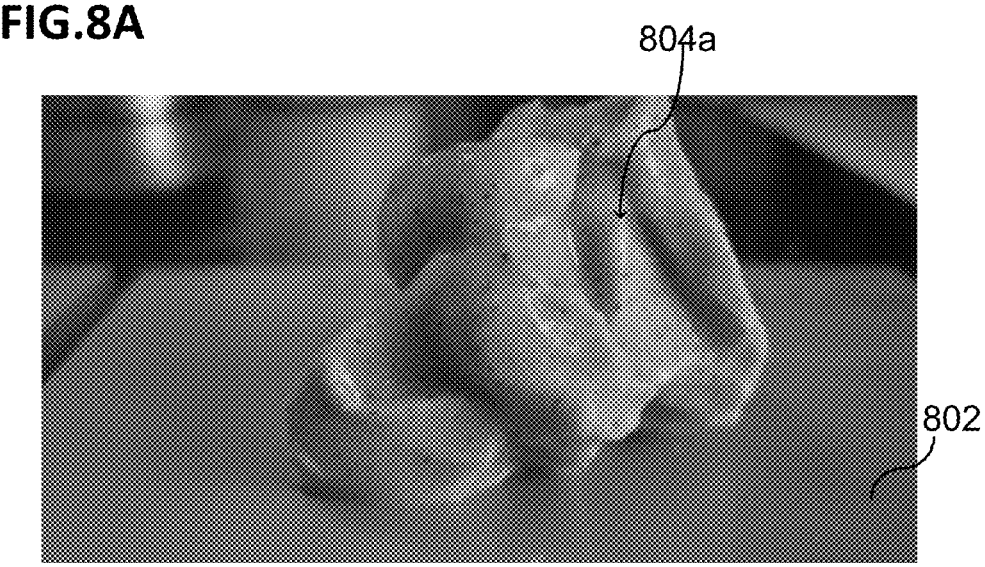
FIGS. 8A and 8B show a press cake (forming example and comparative example of the present disclosure)
Figure 8B:
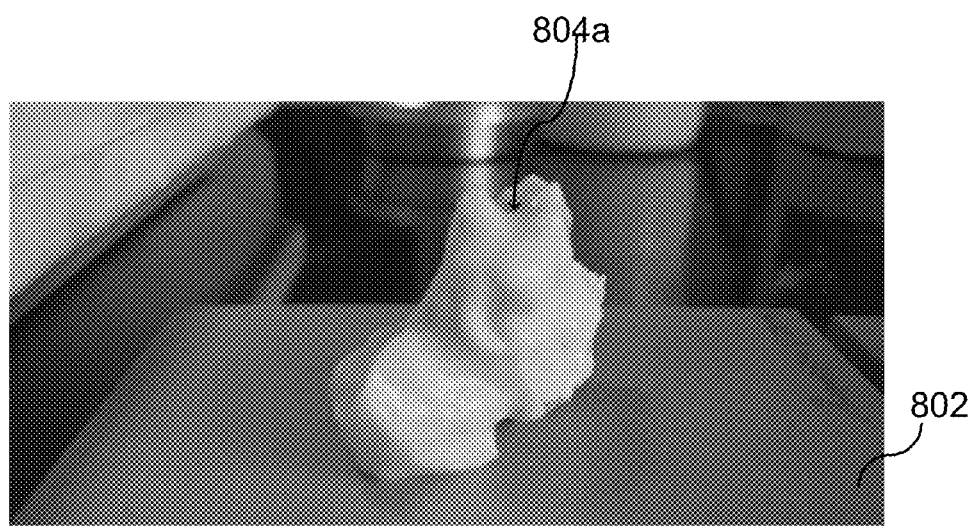

When collecting the filter press cake, e.g. with a spatula, it was observed, that the filter press cake 804*a* was sticking more to the aluminium plate than the filter press cake 804*b*. FIGS. 8A and 8B show the filter press cakes 804*a* and 804*b* in accordance with the present disclosure. As shown on FIGS. 8A and 8B, both filter press cakes 804*a* and 804*b* had a solid consistency and no water leaked from them when laid on another aluminium plate 802, showing that the filter press cakes were no sludge. As can be seen in FIG. 8A, example according to one embodiment leads to the formation of a filter press cake 804*a* containing silicon particles and a salt resulting from a reaction of the base with the acid. Press cake 804*a* has a grey color and a heterogene texture. As can be seen in FIG. 8B, comparative example leads to the formation of a filter press cake 804*b* containing a salt resulting from a reaction of the base with the acid but free from silicon particles. Press cake 804*b* has a white homogene aspect.

The main difference between example according to one embodiment and the comparative example was the pH value of the clarified effluent which stayed overnight, e.g. 10 hours, in contact with the solid content. The clarified effluent of comparative example, e.g. without silcon, was completely clear and was acid with a measured pH value of 4.4, when the clarified water of example according to one embodiment, e.g. with silicon, was slightly trouble and its pH value didn't change within the 10 hours in contact with the solid content, e.g. the pH value was from about 7.5 to 8. This shows that the solid content in the comparative example (filter press cake 804*b* before filtration) was acid, while the solid content of example according to one embodiment (filter press cake 804*a* before filtration) was neutral.

Figure 9A:
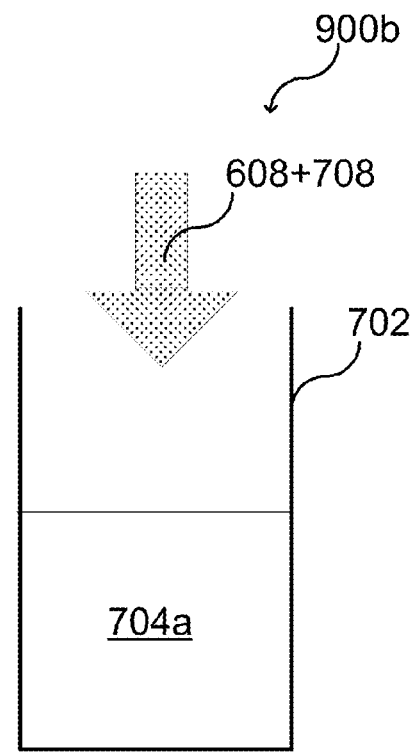
FIGS. 9A and 9B schematically illustrate two specific stages a method of treating an acid effluent including phosphoric acid at two specific stages in accordance with various embodiments.
Figure 9B:
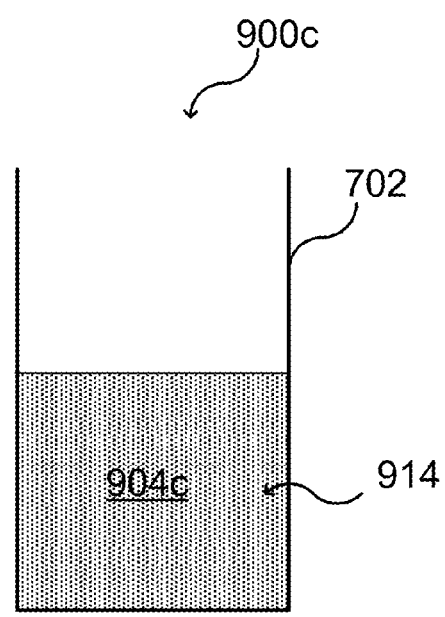

FIGS. 9A and 9B schematically illustrate two processing stages of a method of treating an acid effluent according to various embodiment. As illustrated in FIG. 9A, in 900*b*, a resulting mixture of pre-mixed base 708 (for example solid calcium oxide, calcium hydroxide, barium oxide, barium hydroxide, magnesium hydroxide) and silicon particles 608 is added to the acid effluent including phosphoric acid 704*a* in a vessel 702. This corresponds to processing stages 220 and 230. As illustrated in FIG. 9B, in 900*c*, the further resulting mixture 904*c* is agitated, so that a solid content 914 is formed.

In the following, various embodiments are described, wherein these embodiments are valid for and may be combined with each of the above two methods. Further, it is possible to combine two or more of the below embodiments with each other.

Example 1 is a method of treating an acid effluent including phosphoric acid may include providing an acid effluent including phosphoric acid, generating a mixture by adding to the acid effluent a base and silicon particles, and separating from the mixture a solid content including silicon and a salt resulting from a reaction of the base with the acid.

In Example 2, the subject matter of Example 1 can optionally include that the base is added before the silicon particles.

In Example 3, the subject matter of Example 1 can optionally include that the base and the silicon particles are pre-mixed and added to the acid effluent together.

In Example 4, the subject matter of Examples 1 to 3 can optionally include that the base is selected from the group consisting of calcium hydroxide, calcium oxide, barium hydroxide, barium oxide, magnesium hydroxide and combinations thereof.

In Example 5, the subject matter of Examples 1 to 3 can optionally include that the base is one or more of calcium hydroxide and calcium oxide.

In Example 6, the subject matter of Examples 1 to 5 can optionally include that the silicon particles are from a further effluent.

In Example 7, the subject matter of Examples 1 to 6 can optionally include that the silicon particles are added in the form of a sediment obtained by adding a base to the further effluent containing silicon.

In Example 8, the subject matter of Examples 1 to 7 can optionally include that the solid content is separated by using a filter press.

In Example 9, the subject matter of Examples 1 to 8 can optionally include that the acid effluent originates from a processing of one or more wafers.

In Example 10, the subject matter of Examples 1 to 9 can optionally include that the acid effluent originates from an etching processing of one or more wafers.

In Example 11, the subject matter of Examples 1 to 10 can optionally include that the acid effluent comprises phosphoric acid in an amount of about 1 to about 3 mol/l.

In Example 12, the subject matter of Examples 1 to 11 can optionally include that the amount of base added is such that the pH value of the resulting mixture is from 7 to 8.

In Example 13, the subject matter of Examples 1 to 12 can optionally include that the amount of silicon particles added is such to obtain a mass concentration from about 10 g/l to about 100 g/l in the mixture.

In Example 14, the subject matter of Examples 1 to 13 can optionally include that the acid effluent is agitated at least during the addition of the base.

Example 15 is a method of producing an additive for concrete, the method comprising providing an acid effluent comprising phosphoric acid and generating a mixture by adding to the acid effluent a base and silicon particles. The method further include feeding the mixture into a filter press so as to obtain a filter press cake comprising silicon and a salt resulting from a reaction of the base with the acid.

In Example 16, the subject matter of Example 15 can optionally include that the base is selected from the group consisting of calcium hydroxide, calcium oxide, barium hydroxide, barium oxide, magnesium hydroxide and combinations thereof.

In Example 17, the subject matter of Examples 15 to 16 can optionally include that the base is calcium hydroxide and/or calcium oxide.

In Example 18, the subject matter of Examples 15 to 17 can optionally include that wherein the silicon particles are from a further effluent.

Example 19 is an additive for concrete obtained by the method of example 15, having a pressed form and comprising silicon and a salt resulting from a reaction of the base with the acid.

In Example 20, the subject matter of Examples 19 can optionally include that a solution resulting from a dissolution of at least part of the additive in water is pH neutral.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of treating an acid effluent comprising phosphoric acid, the method comprising:
    providing an acid effluent comprising phosphoric acid;
    generating a mixture by adding to the acid effluent a base and silicon particles; and
    separating from the mixture a solid content comprising silicon and a salt resulting from a reaction of the base with the acid.

2. The method of treating an acid effluent according to claim 1, wherein the base is added before the silicon particles.

3. The method of treating an acid effluent according to claim 1, wherein the base and the silicon particles are pre-mixed and added to the acid effluent together.

4. The method of treating an acid effluent according to claim 1, wherein the base is selected from the group consisting of calcium hydroxide, calcium oxide, barium hydroxide, barium oxide, magnesium hydroxide and combinations thereof.

5. The method of treating an acid effluent according to claim 1, wherein the base is one or more of calcium hydroxide and calcium oxide.

6. The method of treating an acid effluent according to claim 1, wherein the silicon particles are from a further effluent.

7. The method of treating an acid effluent according to claim 1, wherein the silicon particles are added in the form of a sediment obtained by adding a base to the further effluent containing silicon.

8. The method of treating an acid effluent according to claim 1, wherein the solid content is separated by using a filter press.

9. The method of treating an acid effluent according to claim 1, wherein the acid effluent originates from a processing of one or more wafers.

10. The method of treating an acid effluent according to claim 1, wherein the acid effluent originates from an etching processing of one or more wafers.

11. The method of treating an acid effluent according to claim 1, wherein the acid effluent comprises the phosphoric acid in an amount of about 1 to about 3 mol/l.

12. The method of treating an acid effluent according to claim 1, wherein the amount of base added is such that the pH value of the resulting mixture is from 7 to 8.

13. The method of treating an acid effluent according to claim 1, wherein the amount of silicon particles added is such to obtain a mass concentration from about 10 g/l to about 100 g/l in the mixture.

14. The method of treating an acid effluent according to claim 1, wherein the acid effluent is agitated at least during the addition of the base.

15. A method of producing an additive for concrete, the method comprising:
    providing an acid effluent comprising phosphoric acid;
    generating a mixture by adding to the acid effluent a base and silicon particles; and
    feeding the mixture into a filter press so as to obtain a filter press cake comprising silicon and a salt resulting from a reaction of the base with the acid.

16. The method of producing an additive for concrete according to claim 15, wherein the base is selected from the group consisting of calcium hydroxide, calcium oxide, barium hydroxide, barium oxide, magnesium hydroxide and combinations thereof.

17. The method of producing an additive for concrete according to claim 15, wherein the base is calcium hydroxide and/or calcium oxide.

18. The method of producing an additive for concrete according to claim 15, wherein the silicon particles are from a further effluent.

19. An additive for concrete obtained by the method of claim 15, having a pressed form and comprising silicon and a salt resulting from a reaction of the base with the acid.

20. The additive for concrete according to claim 19, wherein a solution resulting from a dissolution of at least part of the additive in water is pH neutral.

* * * * *